US 11,261,648 B2

(12) United States Patent
Axtolis (10) Patent No.: US 11,261,648 B2
(45) Date of Patent: Mar. 1, 2022

(54) MOVABLE BARRIER DISENGAGEMENT DETECTION

(71) Applicant: The Chamberlain Group LLC, Oak Brook, IL (US)

(72) Inventor: Robert Jude Axtolis, Naperville, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 0 days.

(21) Appl. No.: 16/722,956

(22) Filed: Dec. 20, 2019

(65) Prior Publication Data
US 2021/0189785 A1 Jun. 24, 2021

(51) Int. Cl.
| | | |
|---|---|---|
| H02K 17/32 | (2006.01) | |
| E05F 15/695 | (2015.01) | |
| E05F 15/79 | (2015.01) | |
| E05D 15/38 | (2006.01) | |
| H02P 29/00 | (2016.01) | |

(52) U.S. Cl.
CPC ............ *E05F 15/695* (2015.01); *E05D 15/38* (2013.01); *E05F 15/79* (2015.01); *H02P 29/00* (2013.01); *E05Y 2400/33* (2013.01); *E05Y 2400/44* (2013.01); *E05Y 2400/52* (2013.01); *E05Y 2400/65* (2013.01); *E05Y 2900/106* (2013.01)

(58) Field of Classification Search
CPC ............... H02P 29/00; H02P 29/00241; G05B 2219/45242; E05F 15/695; E05F 15/79; E05D 15/38; E05Y 2400/33; E05Y 2400/44; E05Y 2900/106; E05Y 2900/65
See application file for complete search history.

(56) References Cited

U.S. PATENT DOCUMENTS

| | | | |
|---|---|---|---|
| 3,785,089 A | 1/1974 | Smith | |
| 4,905,542 A | 3/1990 | Burm | |
| 5,176,582 A | 1/1993 | Chang | |
| 5,222,327 A | 6/1993 | Fellows | |
| 5,278,480 A | 1/1994 | Murray | |

(Continued)

OTHER PUBLICATIONS

Correcting a garage door opener that fails to travel fully; The Chamberlain Group, Inc.; https://support.chamberlaingroup.com/s/article/Garage-door-opener-fails-to-travel-fully-1480438303344; First published Apr. 16, 2018; 2 pages.

(Continued)

*Primary Examiner* — Karen Masih
(74) *Attorney, Agent, or Firm* — Fitch, Even, Tabin & Flannery LLP (57) ABSTRACT

Systems, methods, and apparatus for detecting movable barrier disengagement are provided. A movable barrier operator system includes a motor configured to be coupled to a movable barrier and move the movable barrier, a motor sensor configured to measure a load value of the motor, communication circuitry configured to receive, from a remote control, a state change request to cause movement of the movable barrier, and a processor circuit. The processor circuit is configured to cause actuation of the motor in response to receipt of the state change request, detect, based on the load value, a disengagement between the motor and the movable barrier, and cause a communication to be sent, in response to detecting the disengagement, to a remote server, the communication indicative of motor disengagement.

28 Claims, 4 Drawing Sheets

(56) References Cited

U.S. PATENT DOCUMENTS

| | | | |
|---|---|---|---|
| 5,297,782 A | 3/1994 | Dombrowski | |
| 5,422,552 A | 6/1995 | Parisi | |
| 5,557,887 A | 9/1996 | Fellows | |
| 5,581,939 A * | 12/1996 | Regan | E05F 15/668 |
| | | | 192/69.62 |
| 5,780,987 A | 7/1998 | Fitzgibbon | |
| 5,894,613 A | 4/1999 | Fenn | |
| 5,903,226 A | 5/1999 | Suman | |
| 5,929,580 A | 7/1999 | Mullet | |
| 5,969,637 A | 10/1999 | Doppelt | |
| 6,097,166 A | 8/2000 | Fitzgibbon | |
| 6,107,765 A | 8/2000 | Fitzgibbon | |
| 6,111,374 A | 8/2000 | Fitzgibbon | |
| 6,118,243 A * | 9/2000 | Reed | E05F 15/41 |
| | | | 318/282 |
| 6,161,438 A | 12/2000 | Mullet | |
| 6,184,641 B1 | 2/2001 | Crimmins | |
| 6,184,787 B1 | 2/2001 | Morris | |
| 6,310,451 B1 | 10/2001 | Fitzgibbon | |
| 6,326,751 B1 | 12/2001 | Mullet | |
| 6,340,872 B1 | 1/2002 | Fitzgibbon | |
| RE37,784 E | 7/2002 | Fitzgibbon | |
| 6,528,961 B1 | 3/2003 | Fitzgibbon | |
| 6,542,077 B2 | 4/2003 | Joao | |
| 6,566,828 B2 | 5/2003 | Fitzgibbon | |
| 6,587,046 B2 | 7/2003 | Joao | |
| 6,624,605 B1 | 9/2003 | Powder | |
| 6,657,409 B1 | 12/2003 | Leivenzon | |
| 6,806,665 B2 | 10/2004 | Fitzgibbon | |
| 6,860,065 B2 | 3/2005 | Griffin | |
| 6,888,335 B2 | 5/2005 | Sato | |
| 6,894,613 B2 | 5/2005 | Stab | |
| 6,940,240 B2 | 9/2005 | Kelkhoff | |
| 6,989,767 B2 | 1/2006 | Fitzgibbon | |
| 6,995,533 B2 | 2/2006 | Fitzgibbon | |
| 7,017,302 B2 | 3/2006 | Brookbank | |
| 7,019,478 B2 | 3/2006 | Gregori | |
| 7,061,197 B1 | 6/2006 | Mullet | |
| 7,073,291 B2 | 7/2006 | Kawanobe | |
| 7,127,848 B2 | 10/2006 | Okada | |
| 7,132,813 B2 | 11/2006 | Gregori | |
| 7,154,377 B2 | 12/2006 | Gregori | |
| 7,183,732 B2 | 2/2007 | Murray | |
| 7,196,611 B2 | 3/2007 | Robb | |
| 7,205,735 B2 | 4/2007 | Keller | |
| 7,208,897 B2 | 4/2007 | Hotto | |
| 7,263,802 B2 | 9/2007 | Fitzgibbon | |
| 7,339,336 B2 | 3/2008 | Gregori | |
| 7,405,530 B2 | 7/2008 | Keller, Jr. | |
| 7,493,726 B2 | 2/2009 | Fitzgibbon | |
| 7,592,767 B2 | 9/2009 | Rodriguez | |
| 7,679,301 B2 | 3/2010 | Gregori | |
| 7,805,977 B2 | 10/2010 | Study | |
| 9,811,958 B1 | 11/2017 | Hall | |
| 2003/0213177 A1 | 11/2003 | Fitzgibbon | |
| 2004/0251868 A1 | 12/2004 | Sato | |
| 2005/0022451 A1 | 2/2005 | Fitzgibbon | |
| 2005/0102903 A1 | 5/2005 | Takahashi | |
| 2009/0124189 A1 * | 5/2009 | Barber | F24F 11/0001 |
| | | | 454/258 |
| 2017/0323502 A1 | 11/2017 | Hall | |
| 2018/0285814 A1 | 10/2018 | Hall | |
| 2018/0357847 A1 * | 12/2018 | Shinar | G07C 9/00309 |
| 2020/0027054 A1 | 1/2020 | Hall | |

OTHER PUBLICATIONS

Garage Door Travel & Force Adjustments; The Chamberlain Group, Inc.; https://supportchamberlaingroup.com/s/article/How-do-I-adjust-the-travel-and-force-limits-1484145519999; First published Jan. 22, 2019; 2 pages.

How to Adjust The Force on Garage Door Opener Models 2500, 2500B, 2500C, 2500D and WD952KCS; The Chamberlain Group, Inc.; https://support.chamberlaingroup.com/s/article/How-to-Adjust-the-Force-on-Garage-Door-Opener-Models-2500-2500B-2500C-2500D-and-WD952KCS; First published Apr. 13, 2018; 2 pages.

How to Adjust the Force on Garage Door Opener Models 3500D, 3500C, HD800D, WD952KCD, WD952KD and WD952LD; The Chamberlain Group, Inc.; https://support.chamberlaingroup.com/s/article/How-to-Adjust-the-Force-on-Garage-Door-Opener-Models-3500D-3500C-HD800D-WD952KCD-WD952KD-and-WD952LD; First Published Apr. 13, 2018; 2 pages.

What does the flashing LED next to the learn button mean; The Chamberlain Group, Inc.; https://support.dealer.liftmaster.com/s/article/What-does-the-flashing-LED-next-to-the-learn-button-mean-1484145519298; First Published Apr. 3, 2019; © Liftmaster|Liftmaster.com; 4 pages.

UL Standard for Safety for Door, Drapery, Gate, Louver, and Window Operators and Systems, UL 325 Fifth Edition, Dated Jun. 7, 2002; pp. 1-186.

* cited by examiner

MOVABLE BARRIER DISENGAGEMENT DETECTION

TECHNICAL FIELD

The present disclosure relates generally to movable barrier operators, and more specifically to movable barrier operator motor disengagement detection.

BACKGROUND

Movable barriers are known, including, but not limited to, single-panel (also known as tilt-up and "California"-style) and sectional/segmented garage doors, pivoting and sliding gates and cross-arms, rolling shutters, and the like. In general, a moveable barrier operator system for controlling such a movable barrier includes a movable barrier operator coupled to a corresponding barrier and configured to cause the barrier to move (typically between closed and opened positions).

In some installations, a movable barrier is coupled to a motor (of the movable barrier operator) via a trolley that is driven by the motor. The movable barrier, in some instances, may be intentionally disengaged from the motor to allow for manual operation of the movable barrier. A motor may also be disengaged from the movable barrier when one or more parts of the movable barrier operator are damaged or misaligned.

SUMMARY

Systems, methods, and apparatuses for managing and controlling network-enabled movable barrier operator systems are described herein. In some embodiments, a movable barrier operator system comprises: a motor configured to be coupled to a movable barrier and move the movable barrier; and a motor sensor configured to measure a load value of the motor. The movable barrier operator system includes communication circuitry configured to receive, from a remote control, a state change request to cause movement of the movable barrier. The movable barrier operator system further includes a processor circuit configured: to cause actuation of the motor in response to receipt of the state change request; to detect, based on the load value, a disengagement between the motor and the movable barrier; and to cause a communication to be sent, in response to detecting the disengagement, to a remote server, the communication indicative of motor disengagement. In some embodiments, the movable barrier operator system may add to the security of the movable barrier by allowing a user, owner, or resident (who may be remote from the property comprising the movable barrier and the associated movable barrier operator) to be notified of motor disengagement such that remedial measures may be taken to reengage the motor or otherwise secure the property against unauthorized entry.

In some embodiments, a method for operating a movable barrier operator system comprises: actuating a motor in response to receipt of a state change request via communication circuitry, the state change request to cause movement by the motor of a movable barrier associated with the motor; and measuring a load value of the motor via a motor sensor. The method includes detecting, at a processor circuit, based on the load value, a disengagement between the motor and the movable barrier. The method further includes sending a communication, in response to detecting the disengagement, to a remote server, the communication indicative of motor disengagement.

In some embodiments, a server system or server computer for managing movable barrier operators comprises communication circuitry configured to communicate via a network with a movable barrier operator and a remote control. The server system includes a processor, and a movable barrier operator database storing a user account associated with the movable barrier operator. The processor is configured to receive a state change request associated with the movable barrier operator from the remote control and send a state change command to the movable barrier operator via the communication circuitry. The processor is configured to determine a disengagement between a motor of the movable barrier operator and an associated movable barrier based on communications with the movable barrier operator, wherein the movable barrier operator comprises a motor sensor configured to measure a load value of the motor. The processor is further configured to send a motor disengagement alert to at least one user device associated with the user account in response to the disengagement.

In some embodiments, a method for managing movable barrier operators comprises: receiving, via communication circuitry, a state change request associated with a movable barrier operator from a remote control; and sending, via the communication circuitry, a state change command to the movable barrier operator. The method includes determining a disengagement between a motor of the movable barrier operator and a movable barrier based on a communication with the movable barrier operator, wherein the movable barrier operator comprises a motor sensor configured to measure a load value of the motor. The method further includes identifying a user account associated with the movable barrier operator based on information stored in a movable barrier operator database, and sending a motor disengagement alert to at least one user device associated with the user account in response to the disengagement.

One example server (computer or system) in communication with a movable barrier operator is configured to receive a communication indicative of a disengagement of a motor of the movable barrier operator. The server is configured to identify a user account associated with the movable barrier operator based on information stored in a movable barrier operator database. The server is further configured to send a motor disengagement alert to at least one user device associated with the user account in response to receiving the motor disengagement communication.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will be further be appreciated that certain actions and/or operations may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
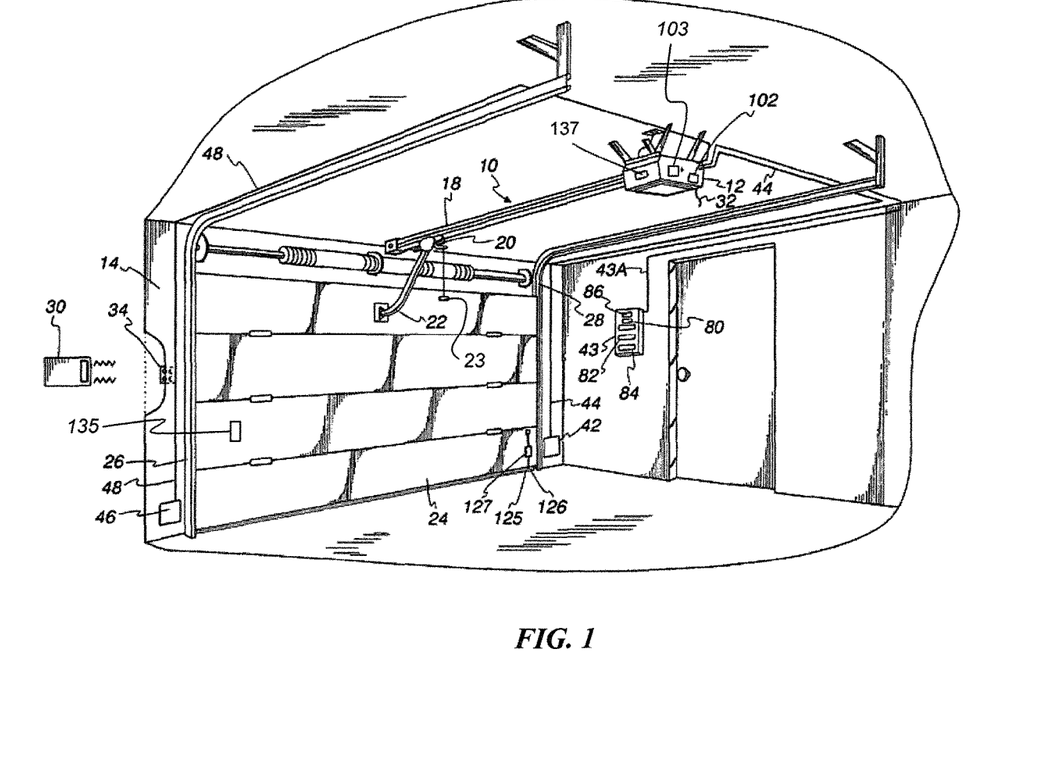
FIG. 1 is a perspective view of an example garage door opener mounted in a garage.

Referring now to the drawings and especially to FIG. 1, a movable barrier operator, such as a garage door opener system, is provided that includes a garage door opener 12 mounted within a garage 14, More specifically, the garage door opener system 10 includes a rail 18 with a trolley 20 shiftable along the rail 18. The trolley 20 has an arm 22 extending to a multiple paneled garage door 24 positioned for movement along a pair of door tracks 26 and 28. The trolley 20 has a handle 23 that may be pulled to disconnect the trolley 20 from the garage door opener 12. When the trolley 20 is disconnected, the garage door 24 is disengaged from the garage door opener 12 and may be manually operated by a person pulling or pushing on the garage door 24. The system 10 includes one or more remote controls, such as a hand-held or portable transmitter 30 configured to send radio frequency signals to an antenna 32 of the garage door opener 12. The radio frequency signals may include a state change request (or a toggle command move garage door 24 from closed to open or vice-versa) that causes the garage door opener 12 to move the garage door 24.

The one or more remote controls may include an external control pad transmitter 34 positioned on the outside of the garage having a keypad thereon. The external control pad transmitter 34 communicates via radio frequency transmissions with the antenna 32 of the garage door opener 12. An optical emitter 42 is connected via a power and signal line 44 to the garage door opener 12. An optical detector 46 is connected via a wire 48 to the garage door opener 12. The optical emitter 42 and the optical detector 46 form a safety sensor of a safety system for detecting an obstruction when the garage door 24 is closing. In another embodiment, the optical emitter 42 and/r optical detector 46 communicate with the garage door opener 12 using wireless approaches. The one or more remote controls may further include a user device such as a smartphone, a package barcode scanner, or a tablet or personal computer (PC).

The garage door opener 12 may further include communication circuitry 102 configured to connect to one or more networks, such as the Internet, via a local area wired or wireless (e.g., Wi-Fi) access point or router in the residence associated with the garage 14 or via a cellular network. In some embodiments, the communication circuitry 102 may broadcast a wireless signal similar to a Wi-Fi router to allow a user device to connect to a controller 103 of the garage door opener 12 via the communication circuitry 102 to facilitate setup and/or configure the garage door opener 12. For example, after a user device is wirelessly connected to the garage door opener 12, the user interface of the user device may be used to select a Wi-Fi network (e.g. SSID) and input a network password to allow the garage door opener 12 to connect to the internet via the Wi-Fi router in the residence associated with the garage 14. In some embodiments, the garage door opener 12 may provide its specifications and status information over a network to a server via the communication circuitry 102. In some embodiments, the garage door opener 12 may receive operation commands such as status change commands from a user device over the network via the server. In some embodiments, the communication circuitry 102 may further comprise a short-range transceiver such as a Bluetooth transceiver for pairing with a user device during setup and receiving configurations (e.g. Wi-Fi settings) from the user device.

The garage door 24 has a conductive member 125 attached. The conductive member 125 may be a wire, rod or the like. The conductive member 125 is enclosed and held by a holder 126. The conductive member 125 is coupled to a sensor circuit 127. The sensor circuit 127 transmits indications of obstructions to the garage door opener 12. If an obstruction is detected, the garage door opener 12 can reverse the direction of the travel of the garage door 24. The conductive member 125 may be part of the safety system also including the optical emitter 42 and the optical detector 46.

The one or more remote controls may include a wall control panel 43 connected to the garage door opener 12 via a wire or line 43A. The wall control panel 43 includes a decoder, which decodes closures of a lock switch 80, a learn switch 82 and a command switch 84. The wall control panel 43 also includes a light emitting diode 86 connected by a resistor to the line 43A and to ground to indicate that the wall control panel 43 is energized by the garage door opener 12. Switch closures are decoded by the decoder, which sends signals along line 43A to the controller 103 coupled to an electric motor within the garage door opener 12. In other embodiments, the wall control panel 43 communicates wirelessly with the garage door opener 12.

The garage door opener system 10 may include one or more sensors to determine the status of the garage door 24. For example, the garage door opener system 10 may include a tilt sensor 135 or an accelerometer mounted to the garage door 24 to detect whether the garage door 24 is vertical (closed) or horizontal (open). Alternatively or additionally, the one or more sensors may include a rotary encoder 137 that detects rotation of a transmission component of the garage door opener 12 such that the controller 103 of the garage door opener 12 may keep track of the position of the garage door 24.

While a garage door is illustrated in FIG. 1, the systems and methods described herein may be implemented with other types of movable barriers such as slide gates, swing gates, barrier arms, driveway gates, and the like. In some embodiments, one or more components illustrated in FIG. 1 may be omitted.

Figure 2:
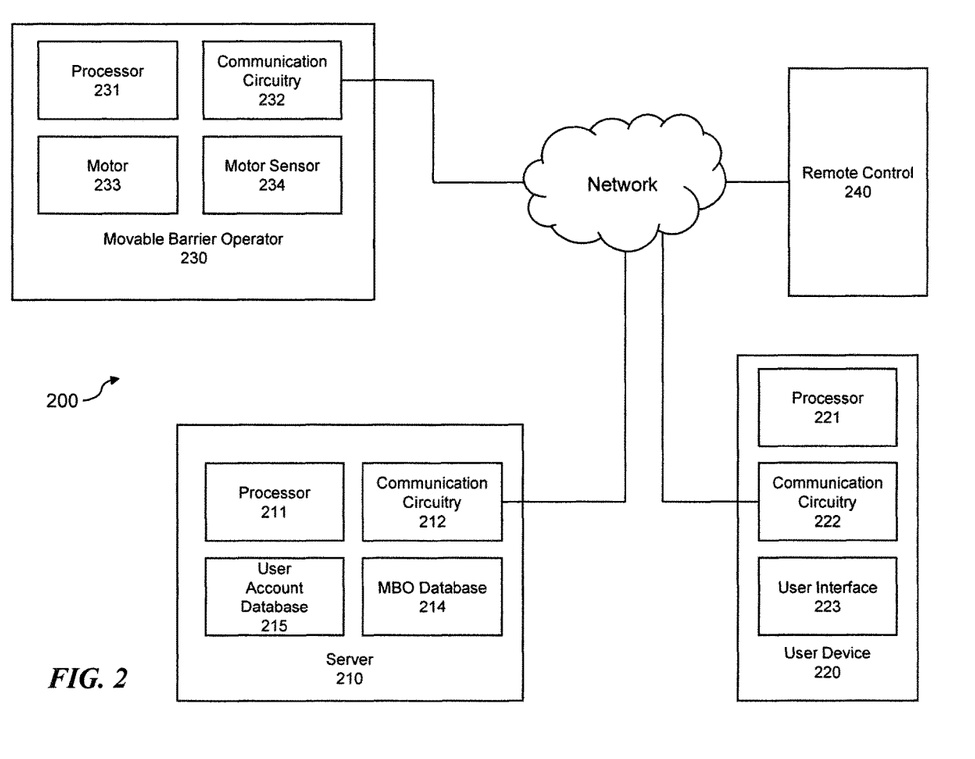
FIG. 2 is a block diagram of an example system for detecting motor disengagement of a movable barrier operator.

FIG. 2 is a block diagram of a system 200 including a network entity or device such as a server 210, a movable barrier operator 230, a user device 220, and a remote control 240. The server 210 generally comprises a processor-based device that may communicate with a plurality of user devices 220, a plurality of movable barrier operators 230, and optionally a plurality of remote controls 240 to manage the movable barrier operators 230. The server 210 includes a processor 211, communication circuitry 212, and a movable barrier operator (MBO) database 214. The processor 211 may comprise one or more of a central processing unit (CPU), a microprocessor, a microcontroller, an application-specific integrated circuit (ASIC), a state machine, a field programmable gate array (FPGA), a programmable logic controller (PLC) and the like. As used herein, a processor circuit may refer to a processor and/or electrical connections associated with the processor. The processor 211 is configured to execute a set of computer-readable instructions stored on a memory to provide disengagement notifications to user devices 220 based on communications with movable barrier operators 230. The processor 211 is further configured to facilitate communication of status information and commands between user devices 220 and/or remote controls 240 and movable barrier operators 230 to allow users to control and/or monitor the status of movable barrier operators 230 over a network. In some embodiments, the processor 211 is configured to perform one or more operations described with reference to FIG. 3 herein.

The communication circuitry 212 generally comprises circuitry configured to connect the processor 211 to a network and exchange messages with user devices 220, movable barrier operators 230, and/or remote controls 240. For example, a state change command may be sent to a movable barrier operator 230 via the communication circuitry 212. In some embodiments, the server 210 may further be configured to use the communication circuitry 212 to exchange movable barrier operator information and commands with third-party service providers such as delivery service providers, home security services, smart home systems, home automation systems, and the like. In some embodiments, the server 210 may further be configured to send commands to security device(s) associated with a movable barrier operator such as a security camera, motion sensor, door sensor, smart door lock, and the like. In some embodiments, the communication circuitry 212 may comprise one or more of a network adapter, a network port, a network modem, a router, a network security device, and the like.

The MBO (movable barrier operator) data structure or database 214 comprises a computer-readable memory storing information associated with movable barrier operators 230. In some embodiments, MBOs may be associated with one or more user accounts in the MBO database 214. In some embodiments, the MBO database 214 may record parameter and/or status information (e.g. open, closed, opening, closing, disengaged, offline) associated with a plurality of unique MBO identifiers such as a serial number. In some embodiments, the MBO database 214 may include an entry for each unique MBO identifier issued by a manufacturer/supplier. The MBO database 214 may record MBO specification information such as MBO make, MBO model, MBO serial number, etc. In some embodiments, the server 210 may further comprise a user account data structure or database 215 storing user account information. Each user account record may comprise a user account identifier, log-in credential (e.g. user name/ID and password), and associated movable barrier operator identifier(s) (e.g. serial number(s)). In some embodiments, the user account database may further store other user information such as contact information (e.g. email, phone number, text number), verified user devices, account preferences, linked third-party service (e.g. home security service, smart home systems, delivery service) accounts, linked security devices, and the like. In some embodiments, the user account database 215 and the MBO database 214 may be combined as a single data structure (e.g. relational database).

The movable barrier operator 230 is configured to actuate a movable barrier based on control signals, messages or commands. The movable barrier operator 230 includes a processor 231, communication circuitry 232, a motor 233, and a motor sensor 234. In some embodiments, the movable barrier operator 230 may include or be connected to (or in communication with) one or more other components such as those described with reference to FIG. 1.

The processor 231 comprises one or more of a central processing unit (CPU), a microprocessor, a microcontroller, an application-specific integrated circuit (ASIC), a state machine, a field programmable gate array (FPGA), a programmable logic controller (PLC), and the like. The processor 231 is configured to execute a set of computer-readable instructions stored on a computer-readable memory to control a movable barrier operator based on commands, signals or messages received from the remote control 240 and/or server 210. In some embodiments, the processor 231 is configured to detect disengagement of the motor 233 based on a load value measurement or measurements from the motor sensor 234. In some embodiments, the processor 231 is further configured to send communication signals indicative of motor disengagement to the server 210. In some embodiments, the processor 231 of the movable barrier operator 230 is configured to perform one or more operations described with reference to FIG. 3 herein.

The motor 233 is configured to actuate movement of a movable barrier when coupled to the movable barrier. In some embodiments, the motor 233 and the movable barrier are connected via a releasable trolley. A user may intentionally disconnect, disengage or otherwise de-couple the trolley from the motor 233 by operating a mechanism (e.g. pulling on a lever or actuating a release) of the trolley. When the trolley is released, the motor 233 is disengaged from the movable barrier and generally cannot cause movement of the movable barrier. In some instances, the motor 233 may also become disengaged from the movable barrier in other ways such as damage or misalignment of movable barrier operator components. When the motor 233 is disengaged (particularly intentionally disengaged) from the movable barrier, a person can generally move the movable barrier between open and closed positions without impedance or resistance from the motor 233. In some embodiments, when the motor is engaged, the motor 233 is configured to resist movement of the movable barrier by other forces. For example, when a garage door is closed, the motor 233 can prevent the garage door from being lifted by a person to an open position even when power is not supplied to the motor.

The motor sensor 234 generally comprises a sensor configured to measure a load value of the motor 233. In some embodiments, the motor sensor 234 may comprise one or more of a revolution per minute (rpm) sensor, a current sensor, a velocity sensor, a torque sensor, and a strain gauge. In some embodiments, the motor sensor 234 may measure the input and/or output of the motor 233. In some embodiments, the motor sensor 234 includes a safety sensor configured to detect an obstruction in a path of the movable barrier based on the load value. The load value measurements are sent to the processor 231 of the movable barrier operator 230 and/or the server 210 for disengagement detection.

The communication circuitry 232 is configured to connect the processor 231 of the movable barrier operator 230 with the server 210 over a network. In some embodiments, the communication circuitry 232 may further be configured to communicate directly or indirectly with the remote control 240 and/or the user device 220. In some embodiments, the communication circuitry 232 may comprise one or more of a network adapter, a network port, a Wi-Fi transceiver, a Bluetooth transceiver, as well as other long-range/wide-area radio transceivers and short-range radio transceivers. In some embodiments, the communication circuitry 232 may also include a radio frequency (RF) receiver for receiving RF control signals (e.g. short-range RF 300-400 MHz) from the remote control 240. In some embodiments, the communication circuitry 232 may be integrated into the head unit of a garage door opener or the control box of other types of movable barrier operators. In some embodiments, the communication circuitry 232 may be a separate unit that communicates with the processor of the movable barrier operator 230 via a wired or wireless (e.g. RF, Bluetooth) connection. For example, the movable barrier operator 230 may include a garage door opener that is not network-connected (or network-enabled) in combination with a feature enhancement device (e.g., the myQ® smart garage hub from the Chamberlain Group, Inc.) which is configured to mimic a radio frequency transmitter to communicate open/close command signals to the garage door opener based on messages received from a client via the Internet.

The user device 220 generally comprises an electronic device configured to allow a user to communicate with the server to manage and/or operate the movable barrier operator 230. The user device 220 may comprise a mobile device, a smartphone, a tablet computer, a personal computer (PC), an internet of things (IoT) device, and the like. The user device 220 includes a processor 221, communication circuitry 222, and a user interface 223.

The processor 221 may comprise one or more of a central processing unit (CPU), a microprocessor, a microcontroller, an application-specific integrated circuit (ASIC), a state machine, a field programmable gate array (FPGA), a programmable logic controller (PLC), and the like. The processor 221 is configured to execute a set of computer-readable instructions stored on a memory to, for example, provide a graphical user interface for a user to: register a movable barrier operator 230 with a user account, and to view the status of the movable barrier associated with the movable barrier operator 230 over a network. In some embodiments, the graphical user interface may be instantiated by a mobile application, a desktop application, a web-based user interface, a website displayed in a browser application, etc. and may be presented as an augmented reality image, a holographic image, a two-dimensional graphical user interface, and the like. In some embodiments, notifications may be provided by a third-party messaging application such as a short message service (SMS), text message, and/or email client. In some embodiments, the processor 211 of the user device 220 may be configured to perform and/or support one or more operations described with reference to FIG. 3.

The communication circuitry 222 is configured to connect the user device 220 with the server 210 over a network. The communication circuitry 222 may comprise one or more of a network adapter, a network port, a cellular network (3G, 4G, 4G-LTE, 5G) interface, a Wi-Fi transceiver, a Bluetooth transceiver, a mobile data transceiver, and the like. The user interface 223 of the user device 220 comprises one or more user input/output devices. In some embodiments, the user interface 223 comprises one or more of a display screen, a touch screen, a microphone, a speaker, one or more buttons, a keyboard, a mouse, an augmented reality display, a holographic display, and the like. The user interface 223 is generally configured to allow a user to interact with the information provided on the user device, such as a graphical user interface for viewing notifications from the server 210.

The remote control 240 generally comprises a device configured to send a state change request to the movable barrier operator 230. In some embodiments, the remote control 240 may comprise a portable transmitter, a wall-mounted transmitter, an exterior keypad transmitter, a user device, a mobile device, a smartphone, a tablet computer, a vehicle, an unmanned ground or aerial vehicle, and the like. In some embodiments, the remote control 240 comprises a control circuit and a memory device. In some embodiments, the remote control 240 may comprise a network adapter (e.g. mobile network transceiver, WiFi transceiver) configured to sends state change requests via the server 210 or another networked service. In some embodiments, the remote control 240 may send the state change request signal directly to the movable barrier operator 230 via a short-range (e.g. 300-400 MHz) radio frequency transceiver. The remote control 240 may include a user interface (e.g. touch screen, buttons) and/or may be operated by an automated system (e.g. delivery robot, drone). In some embodiments, the user device 220 may function as a remote control 240. In some embodiments, a first device (e.g. remote control 240) may send the state change request and a disengagement notification may be sent to a different device (e.g. user device 220). For example, a delivery person may access a garage to perform delivery and use their remote control 240 to request a state change. When disengagement is detected, the server 210 may send a notification to the homeowner's user device 220 and/or to the delivery service provider associated with the delivery person.

While one user device 220, one movable barrier operator 230, and one remote control 240 are shown in FIG. 2, the server 210 may communicate with a plurality of user devices 220 and with a plurality of movable barrier operators 230 to provide disengagement notifications.

Figure 3:
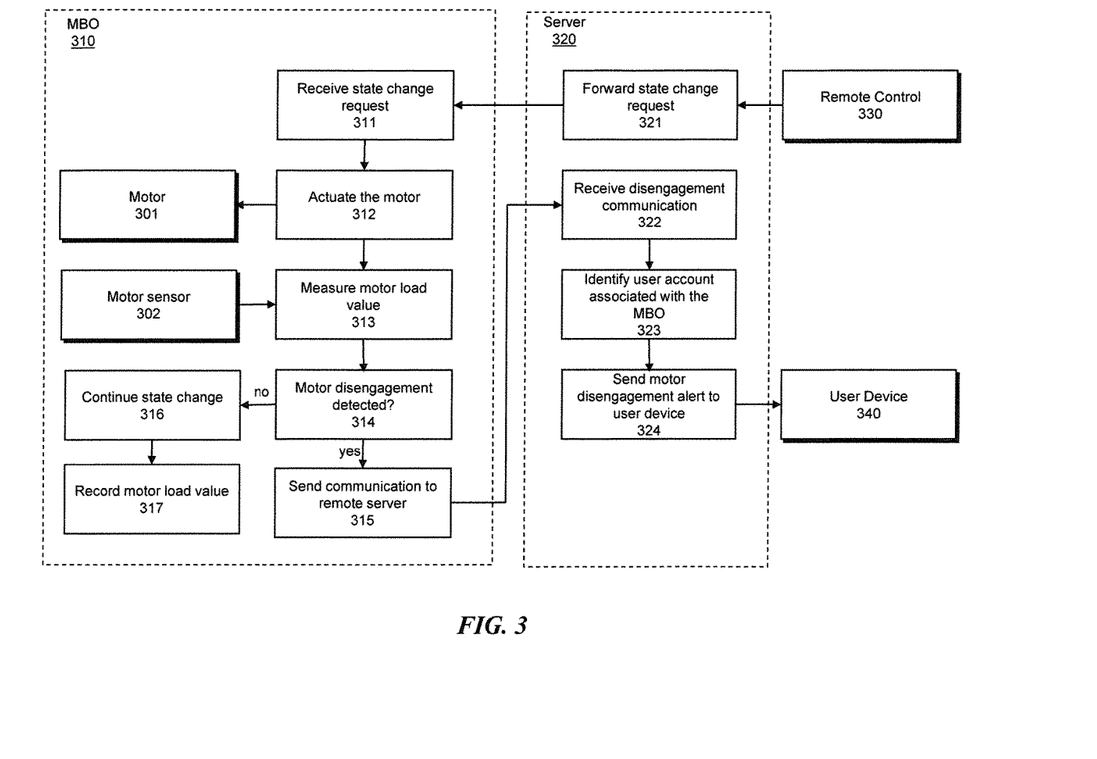
FIG. 3 is a flow diagram of an example method for detecting motor disengagement of a movable barrier operator.

Next referring to FIG. 3, an example method for detecting disengagement of a movable barrier motor according to some embodiments is shown. In some embodiments, one or more of the operations in FIG. 3 may be performed by an MBO 310 communicating with a server 320. In some embodiments, the MBO 310 and the server 320 may be the movable barrier operator 230 and the server 210 respectively as described with reference to FIG. 2.

Prior to the method shown in FIG. 3, a system implementing the method may require or otherwise specify that a user establish a user account and/or log in to an existing user account and register the MBO 310 with the user account. In block 321, the server 320 receives a state change request for actuating the movable barrier operator from a remote control 330. The state change request generally identifies an MBO and/or a user account associated with an MBO. The server 320 is configured to communicate a message, command or request regarding the state change request to the identified MBO. In some embodiments, instead of going through the server 320, a remote control 330 may directly send a state change request to the MBO 310. For example, the remote control 330 may comprise a handheld RF transmitter configured to transmit a short-range signal to the MBO 310.

In block 311, the MBO 310 receives the communication regarding the state change request from the server 320 or the remote control 330. In block 312, the MBO 310 supplies power to or otherwise activates or actuates the motor 301 in response to receiving the state change request. Power may be supplied to the motor 301 for opening or closing the movable barrier. In block 313, the motor sensor 302 measures motor load value while the motor is being actuated. In some embodiments, the motor sensor 302 comprises one or more of a revolution per minute (rpm) sensor, a current sensor, a velocity sensor, a torque sensor, and a strain gauge. In some embodiments, a load value may be an rpm value, a current value, an energy value (e.g. watts), a velocity value, a force or torque value (e.g. newton), etc. In some embodiments, the motor sensor 234 comprises a safety sensor configured to detect an obstruction in a path of the movable barrier based on the load value. For example, when the measured load exceeds a threshold or deviates from an expected profile, the MBO 310 may cause the movable barrier to stop or reverse.

In block 314, the MBO 310 determines whether motor disengagement is detected based on the motor load value measured in block 313. In some embodiments, the MBO 310 is configured to detect the disengagement in response to detecting that the load value remains below a threshold value for a duration of time. In some embodiments, the threshold value may be determined based on historical data stored in the MBO 310 or the server 320 such as load value measurements from one or more prior state changes of the movable barrier. For example, the MBO 310 may run through an initial calibration to determine the threshold value or continuously monitor and update the threshold value during normal operations of the movable barrier. A load value exceeding the threshold may generally correspond to the load experienced by the motor 301 as the motor 301 moves the mass of the movable barrier. In some embodiments, the MBO 310 is configured to detect the disengagement based at least in part on a deviation of a profile of the load value from an expected profile of the load value. The profile of the load value may generally refer to a plurality of load values measured (and optionally averaged or otherwise processed) over at least a portion of the duration of the motor actuation. The MBO 310 may be configured to determine a deviation between the profile of the load value and the expected profile of the load value in response to a determination that the profile of the load value lacks at least one peak associated with movement of the movable barrier. In some embodiments, the expected profile of the load value may be determined based on load value measurements from one or more prior state changes of the movable barrier. In some embodiments, the MBO 310 is configured to detect a disengagement of the movable barrier from the MBO 310 upon detecting that the load value remains within a predetermined range over a period of time while power is supplied to the motor 301. The predetermined range may generally correspond to variation of an actuated movable barrier such as variations in motor load as rollers pass along tracks such as door tracks 26, 28. The lack of such variations may correspond to the motor 301 being disengaged from a movable barrier. In some embodiments, the predetermined range of a load value may be determined based on load value measurements from one or more prior state changes of the movable barrier.

If disengagement is not detected in block 314, in block 316, the MBO 310 continues with executing the state change. In some embodiments, disengagement detection in 314 may continue during the duration of the state change (opening or closing the movable barrier). In some embodiments, disengagement detection may only be performed during an initial period (e.g., a short time such as one second, two seconds, three seconds) of the motor actuation. In some embodiments, during or after the state change, the motor load values measured during the state change may be recorded in block 317 and used to determine a threshold, an expected profile, and/or an expected variation range for future instances of disengagement detection (i.e. block 314). In some embodiments, the MBO 310 may further send a state change completion confirmation message to the server. If disengagement is detected in block 314, in block 315, the MBO 310 sends a communication to the remote server 320, the communication indicative of motor disengagement. In some embodiments, in block 315, the MBO 310 may also stop the motor 301. In some embodiments, the MBO may be configured to cause the motor to be driven to reengage the movable barrier in response to detecting disengagement in block 314 or in response to receiving a command from the server 320, a user device, and/or a remote control.

In block 322, the server 320 receives the disengagement communication. In some embodiments, the MBO 310 may only notify the server 320 when disengagement is determined at the MBO 310. In some embodiments, the MBO 310 may send motor sensor measurements to the server 320 as the motor is actuated, and the server 320 may monitor the measurements to detect disengagement. In some embodiments, block 314 may be performed instead at the server 320 and may be omitted at the MBO 310. In some embodiments, disengagement may be determined at both the MBO and the server. For example, the MBO may determine a possible disengagement and communicate this to the server along with sensor data for verification or double checking. In block 323, the server 320 identifies at least one user account associated with the MBO 310. User account and MBO associations may be retrieved from an MBO and/or user account database.

In block 324, the server 320 provides a motor disengagement alert to at least one user device 340 associated with the user account. The user device 340 may be the same or different device from the remote control 330 that submitted the state change request. In some embodiments, the alert may comprise a text message, an email, a phone call, a mobile application (e.g. push) notification, and the like. In some embodiments, the user device 340 may provide a graphical user interface such as a mobile application, a program, a web page, or the like with information from the server 320. The graphical user interface may be used to view the alert and other status information associated with the movable barrier. In some embodiments, the graphical user interface may further be used to request a state change, allowing the user device 340 to function as a remote control 330. In some embodiments, the server 320 may provide, via the user device 340, instructions to reengage the motor 301 with the movable barrier based on a movable barrier operator indicator associated with the MBO 310. For example, the model of the MBO 310 may be determined based on the movable barrier operator indicator (e.g. model number, serial number) and reengagement instructions associated with the model may be retrieved and provided to the user device 340. In some embodiments, the graphical user interface of the user device 340 may include an option to remotely command the reengagement of the motor and movable barrier. When the option is selected, the MBO 310 may be instructed to cause the motor 301 to be driven to reengage the movable barrier.

In some embodiments, the server 320 may further send a disengagement alert to a third-party service provider such as a security service provider or a delivery service provider. For example, a home security service provider or law enforcement may be notified to monitor the area to prevent unlawful entry through the disengaged movable barrier. In another example, if the state change request originated from a delivery person that enters the garage to leave a package, the delivery service provider associated with the delivery person may be notified as the delivery person may not have followed proper protocol when exiting the garage.

In some embodiments, the server 320 may be configured to update a status indicator in a movable barrier operator database to indicate motor disengagement of the movable barrier operator. The server 320 may not forward further state change requests to the MBO 310 while the MBO 310 is indicated in the database as disengaged. In some embodiments, after the motor 301 has been reengaged and a successful state change has been carried out, the MBO 310 and/or a user (via a user device) may notify the server 320 to update the status of the MBO.

In some embodiments, the server 320 may further be configured to send a command to at least one security device associated with the movable barrier operator in response to receiving the motor disengagement signal. In some embodiments, the user account associated with the MBO may further be associated with one or more security devices such as a smart lock, a security camera, a door/window sensor, and the like. The command may turn and/or engage on the security device. For example, the command may turn on a security camera in the garage or cause a smart lock to lock a door leading from the garage to the house.

Figure 4A:
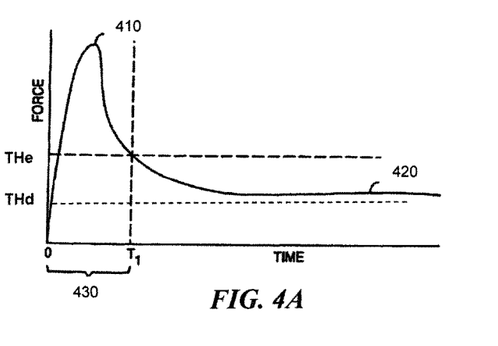
FIGS. 4A and 4B are illustrations of example force response waveforms.
Figure 4B:
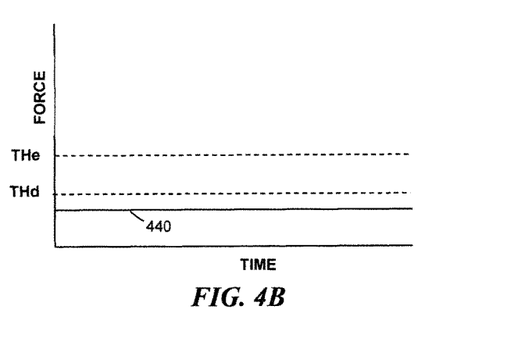

Next referring to FIGS. 4A and 4B, examples of force response over time during an actuation of a movable barrier are shown. FIG. 4A may correspond to an engaged motor while FIG. 4B may correspond to a disengaged motor. When the motor is actuated, a peak 410 is observed in the force response 420 of an engaged motor during the initial period 430 due to inertia or other factors such as friction of rollers of the movable barrier in tracks. In some embodiments, disengagement of the movable barrier from the movable barrier operator may be detected based on the lack of the peak 410 as shown in the force response 440 in FIG. 4B. Following the initial period 430, the force response 420 may level off to between an expected force value threshold THe and a disengagement force value threshold THd with some variation/fluctuation. A force exceeding expected force value threshold THe following the initial period 430 may be indicative of an obstruction. In some embodiments, the lack of expected variation in the force response 440 as shown in FIG. 4B may be indicative of a disengaged motor. In some embodiments, a force response 440 that remains below THd may be indicative of a disengaged motor. As shown in FIG. 4B, the force response 440 of a disengaged motor may be generally flat and may remain below the THd for a duration. In some embodiments, THe and THd may be dynamically determined based on one or more prior actuations of a movable barrier.

The waveforms in FIGS. 4A and 4B are provided for illustrative purposes only. Waveforms may vary based on a movable barrier operator's construction, configuration, operating condition, and the like. For example, the amplitude, duration, and shape of the initial peak 410 and variations in the following period may vary. In some embodiments, each movable barrier operator may be calibrated to determine the expected force response and/or load value profile. In some embodiments, successful actuations of the movable barrier may be used to determine the expected force response and/or load value profile for subsequent actuations.

As MBOs are increasingly being configured to be actuated over a network and by third parties (e.g. delivery services), a homeowner or resident is often not present to observe a disengaged movable barrier in person. Since a disengaged movable barrier may be opened manually, a home can be left vulnerable to unlawful entry. There can also be an error in the status (e.g. open or close) of the movable barrier tracked by the server. In some embodiments, with the methods and system described herein, motor disengagement may be automatically detected, and the owner or resident may be notified to take remedial action.

Those skilled in the art will recognize that a wide variety of modifications, alterations, and combinations can be made with respect to the above-described embodiments without departing from the scope of the invention and that such modifications, alterations, and combinations are to be viewed as being within the ambit of the inventive concept. For example, the server 210 may be constituted by two or more server computers connected to provide the server operations discussed above.

What is claimed is:

1. A movable barrier operator system comprising:
   a motor configured to be coupled to a movable barrier and move the movable barrier;
   a motor sensor configured to measure a load value of the motor;
   communication circuitry configured to receive, from a remote control, a state change request to cause movement of the movable barrier; and
   a processor circuit coupled to the motor sensor and the communication circuitry, the processor circuit configured to:
      cause actuation of the motor in response to receipt of the state change request;
      detect, based on the load value, a disengagement between the motor and the movable barrier; and
      cause a communication to be sent to a remote server in response to detecting the disengagement, the communication indicative of motor disengagement;
      wherein the motor sensor comprises a safety sensor configured to detect an obstruction in a path of the movable barrier based on the load value.

2. The movable barrier operator system of claim 1, wherein the processor circuit is configured to detect the disengagement in response to detecting that the load value remains below a threshold value for a duration of time.

3. The movable barrier operator system of claim 2, wherein the processor circuit is further configured to:
   determine the threshold value based on load value measurements from one or more prior state changes of the movable barrier.

4. The movable barrier operator system of claim 1, wherein the processor circuit is configured to detect the disengagement based at least in part on deviation of a profile of the load value from an expected profile of the load value.

5. The movable barrier operator system of claim 4, wherein the processor circuit is configured to determine the deviation between the profile of the load value and the expected profile of the load value in response to a determination that the profile of the load value lacks at least one peak associated with movement of the movable barrier.

6. The movable barrier operator system of claim 1, wherein the processor circuit is configured to detect the disengagement upon a detection that the load value remains within a predetermined range over a period of time while power is supplied to the motor.

7. The movable barrier operator system of claim 1, wherein the processor circuit is further configured to cause the motor to be driven to reengage the movable barrier in response to detection of the disengagement.

8. The movable barrier operator system of claim 1, wherein the safety sensor comprises one or more of a revolution per minute (rpm) sensor, a current sensor, a velocity sensor, a torque sensor, and a strain gauge.

9. A method for operating a movable barrier operator system, the method comprising:
   actuating a motor in response to receipt of a state change request via communication circuitry, the state change request configured to cause movement by the motor of a movable barrier associated with the motor;

measuring a load value of the motor via a motor sensor;
detecting at a processor circuit, based on the load value, a disengagement between the motor and the movable barrier; and
sending a communication, in response to detecting the disengagement, to a remote server, the communication indicative of motor disengagement;
wherein the motor sensor comprises a safety sensor configured to detect an obstruction in a path of the movable barrier based on the load value.

10. The method of claim 9, wherein detecting the disengagement comprises detecting that the load value remains below a threshold value for a duration of time.

11. The method of claim 10, further comprising:
determining the threshold value based on load value measurements from one or more prior state changes of the movable barrier.

12. The method of claim 9, wherein detecting the disengagement comprises detecting that a profile of the load value deviates from an expected profile of the load value.

13. The method of claim 12, wherein detecting that the profile of the load value deviates from the expected profile of the load value comprises:
detecting that the profile of the load value lacks at least one peak associated with movement of the movable barrier.

14. The method of claim 9, wherein detecting the disengagement comprises detecting that the load value remains within a predetermined range over a period of time while power is supplied to the motor.

15. The method of claim 9, further comprising driving the motor to reengage the movable barrier in response to detecting the disengagement.

16. The method of claim 9, wherein the safety sensor comprises one or more of a revolution per minute (rpm) sensor, a current sensor, a velocity sensor, a torque sensor, and a strain gauge.

17. A server system for managing movable barrier operators, the server system comprising:
communication circuitry configured to communicate via a network with a movable barrier operator and a remote control;
a movable barrier operator database storing a user account associated with the movable barrier operator; and
a processor configured to:
receive a state change request associated with the movable barrier operator from the remote control;
send a state change command to the movable barrier operator via the communication circuitry;
determine a disengagement between a motor of the movable barrier operator and a movable barrier based on communications with the movable barrier operator, wherein the movable barrier operator comprises a motor sensor configured to measure a load value of the motor; and
send a motor disengagement alert to at least one user device associated with the user account in response to the disengagement.

18. The system of claim 17, wherein the processor is further configured to update a status indicator in the movable barrier operator database to indicate motor disengagement of the movable barrier operator.

19. The system of claim 17, wherein the processor is further configured to provide, via the at least one user device, instructions to reengage the motor with the movable barrier based on a movable barrier operator indicator associated with the movable barrier operator.

20. The system of claim 17, wherein the processor is further configured to send a command to at least one security device associated with the movable barrier operator in response to the disengagement.

21. A method for managing movable barrier operators, the method comprising:
receiving, via communication circuitry, a state change request associated with a movable barrier operator from a remote control;
sending, via the communication circuitry, a state change command to the movable barrier operator;
determining a disengagement between a motor of the movable barrier operator and a movable barrier based on a communication with the movable barrier operator, wherein the movable barrier operator comprises a motor sensor configured to measure a load value of the motor;
identifying a user account associated with the movable barrier operator based on information stored in a movable barrier operator database; and
sending a motor disengagement alert to at least one user device associated with the user account in response to the disengagement.

22. The method of claim 21, further comprising updating a status indicator in the movable barrier operator database to indicate motor disengagement of the movable barrier operator.

23. The method of claim 21, further comprising providing, via the at least one user device, instructions to reengage the motor with the movable barrier based on a movable barrier operator indicator associated with the movable barrier operator.

24. The method of claim 21, further comprising sending a command to at least one security device associated with the movable barrier operator in response to the disengagement.

25. A non-transitory computer readable medium storing instructions that, when executed by a server, cause the server to perform operators comprising:
receiving, via communication circuitry, a state change request associated with a movable barrier operator from a remote control;
sending, via the communication circuitry, a state change command to the movable barrier operator;
determining a disengagement between a motor of the movable barrier operator and a movable barrier based on a communication with the movable barrier operator, wherein the movable barrier operator comprises a motor sensor configured to measure a load value of the motor;
identifying a user account associated with the movable barrier operator based on information stored in a movable barrier operator database; and
sending a motor disengagement alert to at least one user device associated with the user account in response to the disengagement.

26. The non-transitory computer readable medium of claim 25, the operations further comprising updating a status indicator in the movable barrier operator database to indicate motor disengagement of the movable barrier operator.

27. The non-transitory computer readable medium of claim 25, the operations further comprising providing, via the at least one user device, instructions to reengage the motor with the movable barrier based on a movable barrier operator indicator associated with the movable barrier operator.

28. The non-transitory computer readable medium of claim 25, the operations further comprising sending a command to at least one security device associated with the movable barrier operator in response to the disengagement.

\* \* \* \* \*